United States Patent [19]

Wood et al.

[11] Patent Number: 5,146,145

[45] Date of Patent: Sep. 8, 1992

[54] ELECTRIC DRIVE SYSTEM FOR SUBMARINE MACHINERY

[75] Inventors: Edwin H. Wood, North Franklin; Russell D. Calasant, Old Lyme, both of Conn.

[73] Assignee: The United States of America as represented by the Secretary of the Navy, Washington, D.C.

[21] Appl. No.: 712,785

[22] Filed: Jun. 10, 1991

[51] Int. Cl.[5] .............................................. H02P 6/02
[52] U.S. Cl. .................................... 318/254; 318/138
[58] Field of Search ......................... 318/138, 254, 439

[56] References Cited

U.S. PATENT DOCUMENTS

| | | | |
|---|---|---|---|
| 4,546,293 | 10/1985 | Peterson et al. | 318/254 |
| 4,988,273 | 1/1991 | Faig et al. | 425/145 |
| 5,015,927 | 5/1991 | Reichard | 318/139 |
| 5,023,528 | 6/1991 | Saidin et al. | 318/254 |
| 5,023,924 | 6/1991 | Tajima et al. | 318/254 X |

Primary Examiner—Bentsu Ro
Attorney, Agent, or Firm—Michael J. McGowan; Prithvi C. Lall; Michael F. Oglo

[57] ABSTRACT

An electric drive system that is used in submarines, for powering or controlling towed arrays handling systems and other machinery, which has at least one submersible brushless direct current motor whose operation is monitored and regulated by a 6-step variable bus motor controller receiving command signals from a control and indicator unit. The controller receives, in addition to the command signals for the operation of the motor from the control and indicator unit, signals indicative of the rotational velocity of the motor from the motor itself. The controller comprises a servo-mechanism unit that compares the two signals and adjusts the speed of the motor in compliance with the command signals from the control and indicator unit.

6 Claims, 3 Drawing Sheets

ELECTRIC DRIVE SYSTEM FOR SUBMARINE MACHINERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an electric drive system. More particularly the system comprises a control and indicator unit that directs the operation of at least one submersible brushless direct current motor with each motor having a 6-step, variable-bus motor controller.

(2) Description of the Prior Art

Before the development of thin-line arrays (TLA), towed arrays were large in diameter, (e.g., 3 in.), and shorter than the length of a submarine.

Large-diameter arrays currently in use in the Fleet are towed on a long cable behind the submarine. The cable is stowed on a reel inside the submarine pressure hull, while the large-diameter array is stowed in the free-flooding area outside the submarine pressure hull.

Advances in Soviet ship silencing have made their submarines quieter and less detectable by our large-diameter arrays. The large-diameter towed array had to be made longer to improve its performance. The longer array had to be made thinner, in order to reduce the drag produced by pulling it through the water and to make it stowable on the submarine when In 1978, the Navy began development of the TB-23/BQ TLA. Because the TB-23/BQ TLA was significantly longer than a submarine, it was stored with the tow cable on a reel external to the submarine pressure hull. This external reel requirement led to the development of two handling systems. The choice of which of the two handling systems was used depended on the class of the submarine. Both of these handling systems were powered by hydraulic motors. These hydraulic motors were located external to the pressure hull in the sea water environment. Use of hydraulic motors external to the pressure hull represented a precedent in that although hydraulics had long been used to power external machinery, the hydraulic components had always been located inside the pressure hull and connected to the external machinery by a through hull drive shaft. The hydraulic motors were used, however, because of the lack of an available electric alternative having the combined power, control, reliability, and structureborne noise characteristics required for driving a cable stowage reel or a cable drive unit under water.

SUMMARY OF THE INVENTION

Accordingly, it is a general purpose and object of the present invention to provide an improved electric drive system. An additional object is that the electric drive system meets requirements for use on U.S. Navy combatant submarines. It is a further object that the drive system have a submersible electric drive motor. Another object is that the system be capable of driving a thin-line array handling system and other internal or external machinery in a submarine.

These objects are accomplished with the present invention by providing a system comprising a plurality of submersible brushless direct current motors (BDCMs) each controlled by a motor control unit. The more motors and motor control units are operated by a system control and indicator unit.

DESCRIPTION OF THE PREFERRED EMBODIMENT

Figure 1:
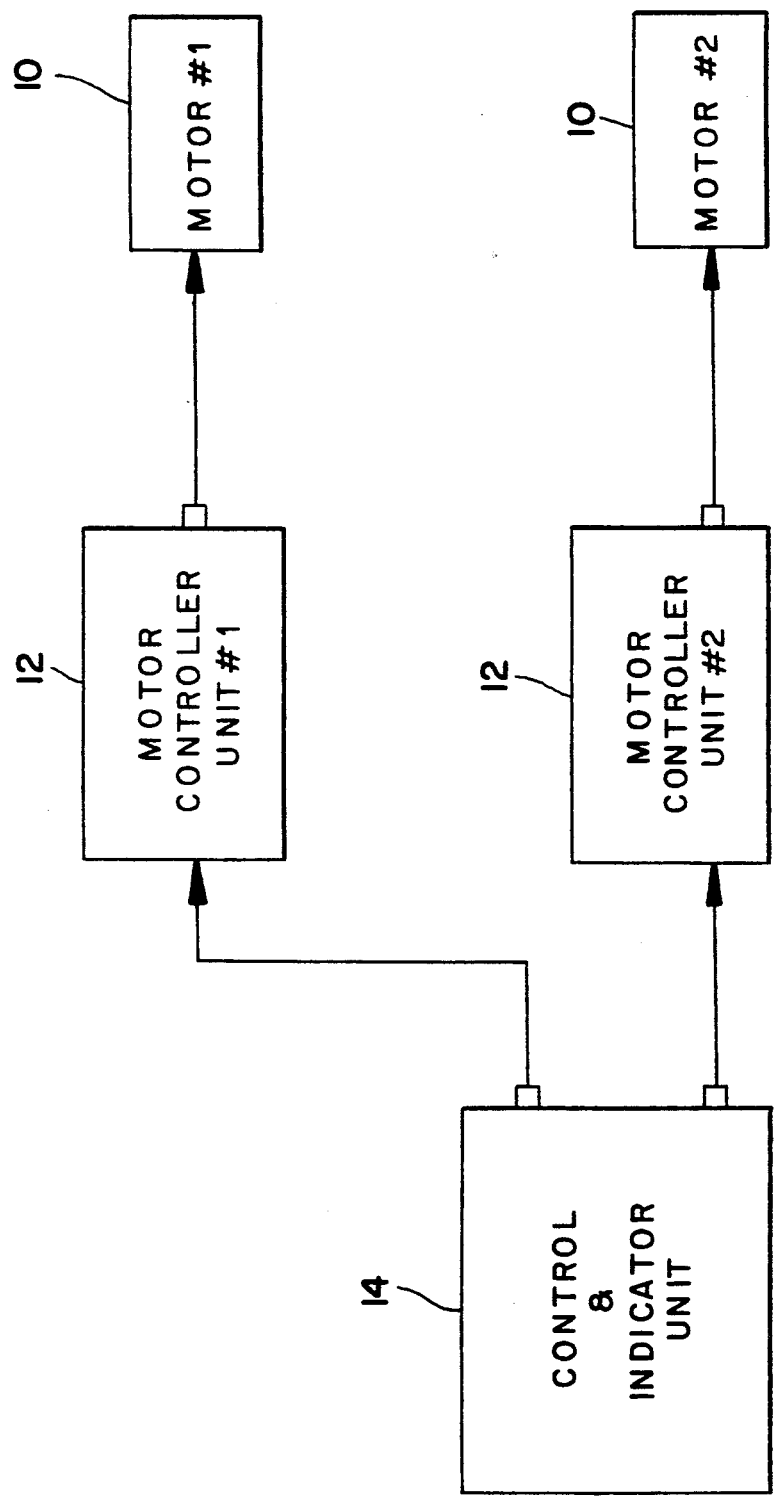
FIG. 1 is a block diagram of the electric drive system in accordance with the present invention.

Referring now to FIG. 1 there is shown an electric drive system that is comprised of two electric motors 10, each equipped with its dedicated motor controller 12 plus a system control and indicator unit 14 whose function is to control the action of the system motor/motors 10 in a preprogrammed manner.

Figure 2:
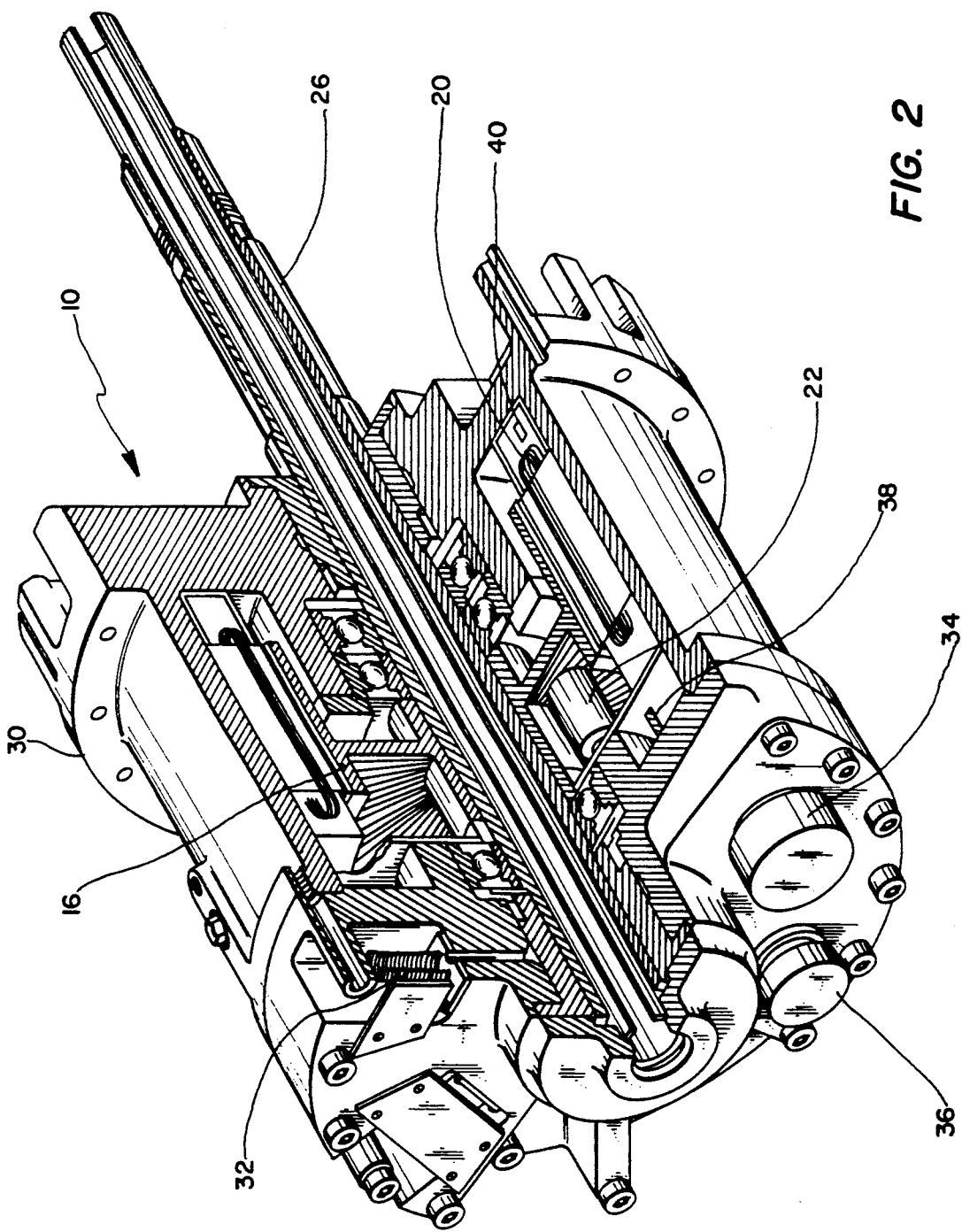
FIG. 2 is a cutaway view of one of the submersible brushless direct-current motors of FIG. 1.

Refer now to FIG. 2 for a further description of one of the motors 10. The electric motor 10 is a direct drive brushless D.C. design comprised of three major components; a rotor 16 comprised of a cylinder of rare earth permanent magnets (neodymium boron iron) which rotates within a copper wound cylindrical armature or stator 20, and a solid state resolver 22. The resolver 22 senses the relative position of the magnets On the rotor 16 and the stator windings 20 and sequences a conditioned D.C. electrical current to the various windings of the stator 20 creating a magnetic field reaction which, in turn causes rotation of the rotor 16 and rotor shaft 26. Commutation is accomplished by the motor controller 12 (FIGS. 1 and 3) using signals from the motor's resolver 22. The stator 20 and the solid state resolver 22 are encapsulated by an epoxy material. The internally encapsulated motor 10 is thus protected from sea water corrosion and can in fact operate flooded with seawater. A motor housing 30 is of cast nickel-aluminum-bronze and, as further protection from the sea water environment the motor is pressure compensated by bellows 32 and filled oil. The motor 10 has two electrical connectors 34 and 36 respectively for receiving power and control signals over electrical cables (not shown in FIG. 2). In FIG. 2 the connectors 34 and 36 are shown capped. Salinity sensors 38 are mounted inside the motor to indicate an alarm when a salt water solution of 12% or higher is reached. A thermistor 40 is imbedded in the stator 20 to sense motor temperature. The motor 10 is configured for intended use as a prime mover for a linear cable drive unit (not shown). The motor 10 is preferably 18 inches in diameter and 24 inches long. It produces 1200 ft. lbs. torque throughout a speed range of 0–120 RPM and thus can serve as a brake when energized.

Figure 3:
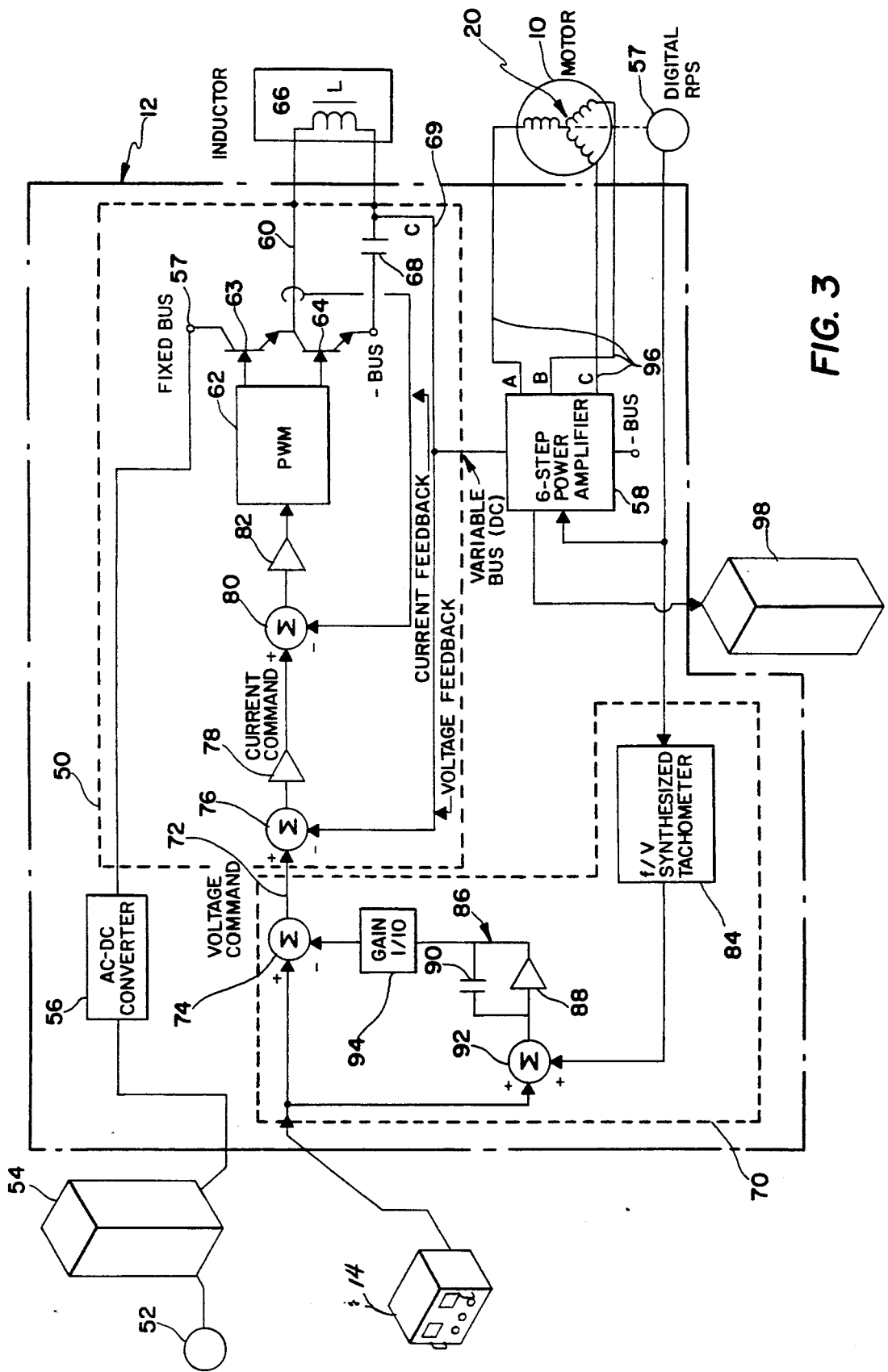
FIG. 3 is a schematic diagram showing the operation of a portion of the electric drive system of FIG. 1.

Refer now to FIG. 3 for a description of the operation of the electric drive system. An AC source 52 applies a voltage to a hexagon transformer 54 that in turn supplies its output to an AC-DC converter 56. The AC-DC converter 56 supplies a fixed DC level voltage to the motor controller 12. The motor controller 12 receives this voltage at the fixed bus 57 of voltage regulator 50. The function of the hexagon transformer 54 is to prevent reflected harmonics from entering the AC source of the ship.

The control and indicator unit 14 applies a command to the pulse width modulator (PWM) 62. The pulse width modulator 62 in conjunction with transistors 63 and 64 creates a chopped DC bus 60 which is further conditioned by inductor 66 and capacitor 68 to form a variable DC bus 69 that is applied to 6-step power amplifier 58. The 6-step power amplifier 58 applies a voltage to the stator windings 20 causing motor 10 to operate. The digital rotation position sensor (RPS) 57 provides the switching control signal to a 6-step power amplifier 58 which controls the sequencing of commutation of the motor 10. With no load on the motor 10 the sequence Would repeat as long as the operator command from the control and indicator unit 14 is constant.

If a torsional load were applied to the shaft of the motor 10 the velocity feedback system 70 would sense the resulting slow down from the digital RPS 57 and the need for more speed would cause an increase in the voltage command 72 at the output of the velocity feedback system 70. This increase in the voltage command 72, from summation translator 74, causes an increase in the bandwidth (frequency) of the chopped DC voltage pulse 60 from the pulse width modulation unit 62 through summation translator 76, current command amplifier 78, summation translator 80, and amplifier 82. The voltage regulator 50 would then increase the DC voltage applied to the variable bus 69 which increases the voltage to the stator armature windings 20 of the motor 10 through the 6-step power amplifier 58, thus increasing the motor's 10 speed to the preset value.

The sequential energizing of the stator windings 20 with respect to the movement of the rotor magnets within the motor 10 creates a variable thrust (torque ripple). The synthesized tachometer 84 smooths the torque ripple by performing a one second integration of the command velocity minus the actual velocity and scaling the output signal to provide the exact amount of voltage required to counter the back electromagnetic force (EMF) at no load on the shaft. Errors in this signal are corrected by the servo-integrator 86 comprised of an amplifier 88 having a capacitor 90 connected in parallel with it that receives its signal from summation translator 92 and applies its output to amplifier 94.

Changes in the voltage level applied to the motor 10 only occur when the stator coils 20 are normally switched by the 6-step power amplifier 58. Electronically induced vibrations in the motor 10 are limited to the fundamental frequency of commutation (30 Hz). Uncorrected, the voltage variations cause magnetostrictive noise and structural vibration in the motor and create electromagnetic emissions from the motor 10 and power cables 96. The inductor 66 of custom design is used to replace the motors inductance and smooth out this power waveform resulting in a greatly reduced motor vibration and audible noise and elimination of electromagnetic emissions.

The motor 10 can be configured in either the constant speed or the constant torque modes by the operator command of the variable bus voltage from the control and indicator unit 14. The motor 10 can also function in a regenerative condition with speed control if the externally applied shaft torque exceeds the commanded voltage. The generated power is dissipated via a load-bank 98 in the form of heat.

There has therefore been described an improved drive system. It is the result of applying the unique features and attributes of brushless direct current electric motors (BDCMs) for powering machinery on a combatant U.S. Navy submarine. Although there are many potential applications for the BDCM drive system on submarines, the specific application described herein is for use as a prime mover and control for towed array handling equipment. The electric drive system is a proposed alternative to the currently used hydraulic drive system.

The electric drive is an innovative system design which blends existing technology with recent advances in component technologies. The result is a BDCM drive system which may be powered from a submarine's AC power supply without contaminating feedback and which complies with stringent submarine requirements for audible noise, structureborne vibration and electromagnetic emissions. The BDCM system may also be driven directly from a DC source with significantly less complexity.

The BDCM, like a hydraulic motor, provides a low speed, high torque, shaft output. Most significantly, the BDCM is unique among electric motors in that it can maintain speed control while operating as either a motor or as a generator under an overhauling torsional load. It can also maintain speed control as it transitions automatically from motor to generator. In this way it is analogous to a hydraulic motor which can operate as either a motor or a pump. It is also analogous to a hydraulic motor in that it can operate in either the constant speed/variable torque or constant torque/variable speed mode just as a hydraulic motor can by control of either hydraulic fluid flow rate or hydraulic fluid pressure, respectively.

The BDCM offers several advantages over the hydraulic motor, however. The BDCM is a mechanically simplistic device contained within an oil filled and pressure compensated enclosure. With internal component encapsulation the motor can function with the housing flooded with sea water. This feature makes the BDCM more reliable than a hydraulic motor in which sea water migration through a faulty seal can cause contamination and catastrophic failure of the entire system. When the BDCM is custom designed for the application, the oil filled housing provides a protected environment for component support bearings, a fail safe brake and sensors for monitoring salinity, temperatures and motor vibration. The housing can also serve as the structural interface between the foundation of the ship and the rotating component.

The BDCM is a microprocessor controlled system which responds instantaneously to programmed commands or to preprogrammed fault sensing. With built in sensors, many of which are inherent in the commutation system, the all electric drive is more responsive than an hydraulic system which has a response mismatch inherent in the electronic/hydraulic interface.

The electric drive is a more maintainable system than a hydraulic drive by virtue of the use of flexible electrical cables vs. welded pipe attachment to the submarine. The electric motors can be located in free flood areas normally below the water line and still be pierside removable with diver assistance. This feature makes it possible to locate a handling system in a free flooding pod external to the submarine such as a vertical stabilizer. Such a design which places the handling system closer to the tow point may be essential for handling future more physically complex arrays. The use of cables vs. welded pipe also offers greater flexibility in locating electronic control components inside the submarine, thus improving space management.

The installation cost of an electric drive system is significantly less than that of a hydraulic system by virtue of (a) the use of approved electric hull penetrators rather than specially designed multiple hydraulic hull penetrators, (b) the use of electrical cable vs. welded pipe and (c) the lesser impact of interfacing the ships electrical system rather than ship's hydraulics. The total system weight of an electric system is also significantly less than the weight of a hydraulic system.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An electric drive system which comprises:
   at least one brushless direct current motor;
   a control and indicator unit connected to provide control signals that determine the output of said brushless direct current motor;
   a motor controller for monitoring and controlling said brushless direct current motor and including a servomechanism having correction means connected to said control and indicator unit for receiving said control signals, said correction means further having a feedback loop receiving output signals from said motor, said correction means comparing said motor output signals with said control signals for providing correction to said motor to drive said motor in compliance with said control signals;
   said motor controller further comprising; a rotation position sensor mechanically connected to sense the relative position of the magnets on the rotor with respect to the stator windings and providing said output signals in response to the mechanical sensing;;
   a velocity feedback system connected to receive and compare said output signals from said rotation position sensor and said control signals from said control and indicator unit, said velocity feedback system providing an error comparison signal for operation of said motor, said velocity feedback system including a synthesized tachometer connected to receive said output signals from said rotational position sensor, said synthesized tachometer smoothing out said received output signals, a first summation translator receiving and operating on said smoothed out signals from said synthesized tachometer and said control signals from said control and indicator unit, and providing output error signals, a velocity servo integrator and an amplifier serially connected to receive and operate on said output error signals and providing a correction signal, and a second translator receiving and operating on said velocity servo integrator correction signal and said control signals from said control and indicator unit and providing said error comparison signal.

2. An electric drive system according to claim 1 further comprising:
   an AC source;
   a hexagon transformer connected to receive said AC source and to provide an AC output; and
   an AC-DC converter connected to receive the AC output from said hexagon transformer and providing a DC input to a voltage regulator.

3. The electric drive system of claim 1 which includes a plurality of brushless direct current motors similar to said at least one brushless direct current motor.

4. The electric drive system of claim 3 which further includes a plurality of respective motor controllers similar to said motor controller.

5. The electric drive system of claim 1 which further includes a voltage regulator to receive a DC power supply and said error comparison signal from said velocity feedback system, said voltage regulator modifying said received DC power supply in compliance with said error comparison signal.

6. The electric drive system of claim 5 which further includes a 6-step power amplifier for receiving said modified DC power supply and said rotation position sensor output signals and supplying voltage controlled power signals to said stator windings.

* * * * *